(12) United States Patent
Feige et al.

(10) Patent No.: US 6,593,262 B2
(45) Date of Patent: *Jul. 15, 2003

(54) POROSIFYING, SOLIDIFICATION-ACCELERATING ADDITIVE FOR BINDING AGENT BUILDING MATERIALS, AND PROCESS OF PRODUCING

(75) Inventors: Reinhard Feige, Schwelm (DE); Gerhard Merker, Schwerte (DE)

(73) Assignee: Aluminium-Salzschlacke Aufbereitungs GmbH, Lunen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,092

(22) Filed: Aug. 15, 2001

(65) Prior Publication Data

US 2002/0124776 A1 Sep. 12, 2002

(30) Foreign Application Priority Data

Aug. 15, 2000 (DE) .......................... 100 40 582

(51) Int. Cl.⁷ ........................................... C04B 35/443
(52) U.S. Cl. ........................ 501/120; 106/692; 106/745; 106/789
(58) Field of Search ........................... 501/120; 106/692, 106/745, 789

(56) References Cited

U.S. PATENT DOCUMENTS 5,856,254 A * 1/1999 Feige et al. .................. 501/128
5,994,252 A * 11/1999 Feige et al. .................. 501/128
6,132,574 A * 10/2000 Feige et al. .................. 204/279

FOREIGN PATENT DOCUMENTS

| DE | 43 19 163 A1 | 12/1994 |
| DE | 43 45368 C2 | 12/1994 |
| DE | 196 44 654 A1 | 4/1998 |
| EP | OS 22 03 958 | 8/1973 |
| EP | OE 33 11 73 | 10/1975 |
| EP | 0 537 635 A1 | 4/1993 |

* cited by examiner

Primary Examiner—Paul Marcantoni
(74) Attorney, Agent, or Firm—Norris McLaughlin & Marcus, P.A.

(57) ABSTRACT

A porosifying, solidification-accelerating additive for binding agent building materials consisting of $Al_2O_3$, 50–90%; MgO, 4–20%; $SiO_2$, 0.5–15%; AlN, 0.1–5%; $Fe_2O_3$, 0.1–5%; CaO, 0.1–5%; F, 0.1–5%; $Na_2O$, 0.1–5%; $K_2O$, 0.1–2%; as well as in the form of metallic particles: Al, 0.1–10%; Si, 0.1–3%; Fe, 0.1–3%; balance in total maximum, 5%; annealing losses, 0.1–15%; and of mineral main constituents in the form of corumdum ($\alpha$-$Al_2O_3$) and spinel (MgO×$Al_2O_3$), wherein the metallic aluminum particles are enveloped by mineral transition modifications from aluminum hydroxide ($Al_2O_3\times3H_2O$) to $\alpha$-aluminum oxide, the powder comprises a particle size of at least 90% smaller than 500 $\mu$m, and the BET surface of the powder amounts to at least 10 m²/g.

7 Claims, No Drawings

POROSIFYING, SOLIDIFICATION-ACCELERATING ADDITIVE FOR BINDING AGENT BUILDING MATERIALS, AND PROCESS OF PRODUCING

BACKGROUND OF THE INVENTION

Cross-Reference To Related Application

This application claims priority to German Patent Application Serial No. 100 40 582.7-45, filed Aug. 15, 2000, entitled "Porosierender, erstarrungs beschleunigender Bindemittelbaustoff-Zusatz und Verfahren zu seiner Herstellung."

1. Field of the Invention

The invention relates to a porosifying, solidification-accelerating additive for binding agent building materials.

2. Description of Related Art

From DE 196 44 654 A1 there is known a processed salt slag of the following composition: $Al_2O_3$=65.7%; $SiO_2$=7.9%; $Fe_2O_3$=1.5%; CaO=3.2%; MgO=10.1%; $TiO_2$=0.9%; MnO=0.3%; $Na_2O$=0.8%; $K_2O$=0.4%; $SO_3$=0.5%; F=1.2%; $P_2O_5$=0.1%; $H_2O$=7.3. Such a powder with the crystalline phases of corundum $\alpha$-$Al_2O_3$, bayerite $Al(OH)_3$, spinel $MgAl_2O_4$, and $\alpha$-quartz $SiO_2$ is processed together with limestone meal at 1150–1300° C. to form sulfo-aluminate clinker. A similar process of producing aluminate cement clinker is known from DE 43 45 368 C2.

For certain applications it is necessary to use porous inorganic binding agent building materials, which are produced with the help of the following additives:

1. Natural or synthetic porous filler materials, such as pumice, pearlite, expanded clay, plastic foam granulate
2. Organic foaming agents, e.g., surfactants or proteins
3. Gas-forming substances, e.g., aluminum powder For producing gas concrete, it is possible to make use of the reaction of aluminum powder with lime (calcium hydroxide), which leads to the formation of hydrogen gas, as a result of which the hardening mixture of sand, cement, lime, and waterfoams up. Aluminum powder is produced by fine-grinding aluminum metal, but there exists a risk of explosion.

From DE 43 19 163 there is known a spinel-containing solid substance that is bonded by cement and which contains a high-alumina filler material. A porosifying effect of said filler material is not identifiable.

For the solidification behavior there are used additives such as calcium chloride, sodium carbonate, and calcium aluminate that are able to accelerate solidification. Other additives for delaying the solidification behavior are also known.

SUMMARY OF THE INVENTION

The invention relates to a porosifying, solidification-accelerating additive for binding agent building materials consisting of $Al_2O_3$, 50–90%; MgO, 4–20%; $SiO_2$, 0.5–15%; AlN, 0.1–5%; $Fe_2O_3$, 0.1–5%; CaO, 0.1–5%; F, 0.1–5%; $Na_2O$, 0.1–5%; $K_2O$, 0.1–2%; as well as in the form of metallic particles: Al, 0.1–10%; Si, 0.1–3%; Fe, 0.1–3%; balance in total maximum, 5%; annealing losses, 0.1–15%; and of at least one mineral main constituent in the form of corundum ($\alpha$-$Al_2O_3$) and spinel ($MgO \times Al_2O_3$). The invention also relates to a process of producing the additive for binding agent building materials.

It is an object of the present invention to provide a high-alumina additive for binding agent building materials or a respective powder and to design same in respect of its structure and composition in such a way that the additive or powder has a porosifying or accelerating effect in inorganic binding agent building materials such as light mortar, porous concrete, insulating foam, and other insulating materials.

In accordance with the invention, the objective is achieved by the characteristics as recited in the claims.

Surprisingly, it has been found that a powder with a high alumina content, which powder can be recovered from the high-alumina residue remaining when processing, especially wet processing, aluminum slag, can be used as a porosifying additive for inorganic binding agent building materials if the metallic aluminum contained in the powder is activated by thermal treatment (drying and partial calcination). The formation of pores can be controlled by the degree of thermal activation. Said additive is additionally advantageous in that the powder at the same time acts as a lean substance or volume forming agent. It is also advantageous in that it is possible to avoid the use of explosive aluminum powder as a volume-forming agent.

The activated porosifying and high-alumina powder in accordance with the invention is characterised in that it comprises:

1. As chemical constituents: $Al_2O_3$, 50–90%; MgO, 4–20%; $SiO_2$, 0.5–15%; AlN, 0.1–5%; $Fe_2O_3$, 0.1–5%; CaO, 0.1–5%; F, 0.1–5%; $Na_2O$, 0.1–5%; $K_2O$, 0.1–2%; as well as in the form of metallic particles: Al, 0.1–10%; Si, 0.1–3%; Fe, 0.1–3%; balance in total maximum, 5%; annealing losses, 0.1–15%;
2. As mineral main constituents corumdum ($\alpha$-$Al_2O_3$) and spinel ($MgO \times Al_2O_3$) and transition modifications from aluminum hydroxide ($Al_2O_3 \times 3H_2O$) to $\alpha$-aluminum oxide, and as a subsidiary constituent aluminum metal;
3. A particle size of at least 90% smaller than 500 $\mu$m; and
4. A specific BET surface of at least 10 $m^2$/g.

The activated porosifying high-alumina powder can be recovered in that alumina-containing residual substances from the wet processing of aluminum salt slag are dried at temperatures of 1000° C. and partially calcinated. Partial calcination means that, on the one hand, the stage of thermally removing only the physical residual moisture has already been passed, but that on the other hand, there still exist percentages of substances that can be thermally vaporized, such as fluoride out of calcium fluoride and crystal water out of aluminum hydroxide/aluminum oxide transition modifications, as well as metallic aluminum.

It is important that the drying and partial calcination of the alumina-containing residual substance is effected by devices that permit a rapid transition of heat to the product, with electric driers, cyclone calcinators, or fluidized-bed calcinators being given preference. In a rotary kiln, heat transition is slower and less uniform, so that the activation success is reduced. Furthermore, in the rotary kiln there occur agglomerates that can only be eliminated by crushing.

The subsequent examples explain the subject of the invention.

COMPARATIVE EXAMPLE 1
(STATE OF THE ART)

In accordance with DE 43 19 163, a nonactivated high-alumina residual substance (designation: SEROX) obtained from processing aluminum salt slag with a content of aluminum oxide of 64%, with the mineralogical main constituents: corundum ($\alpha$-Al2O$_3$) and spinel (MgO×Al$_2$O$_3$), as well as aluminum hydroxide (Al$_2$O$_3$×3H$_2$O), an aluminum metal content of 3%, annealing losses of 11%, a moisture content of 25%, and a particle size of 90% smaller 500 $\mu$m was mixed with alumina cement (Secar 51) with a weight ratio of 1:1 (with reference to the dried substance). For setting the processibility of the mortar, mixing water in the amount of 45% by weight was required. Solidification started after approximately 3 hours. Porosification was not identifiable.

EXAMPLE 2

An alumina-containing powder according to claim 1 was dried by means of a gas-heated air-lift dryer (flue gas temperature approx. 450° C., exhaust air temperature approx. 150° C., holding time less than 10 seconds) and thermally partially activated. The powder (designation: SEROX T) has a residual moisture of 0.8%, an annealing loss of 10%, a content of metallic aluminum of 3%, transition modifications from aluminum hydroxide (Al$_2$O$_3$×3H$_2$O) to $\alpha$-aluminum oxide in the form of AlOOH (boehmite) and a specific BET surface of 27 m$^2$ $\mu$/g.

EXAMPLE 3

The partially activated powder according to Example 2 was calcinated by means of a gas-heated high-temperature mixing cyclone at flue gas temperatures of 600, 750, 900, and 1200° C. and holding times of less than 1 second to form the following products:

| Product | Temperature [° C.] | BET Surface [m$^2$/g] | Pore Distribution [nm] | Al-metal [%] |
|---|---|---|---|---|
| SEROX TK600 | 600 | 36 | 20–200 | 3 |
| SEROX TK750 | 750 | 45 | 20–200 | 3 |
| SEROX TK900 | 900 | 26 | 20–200 | 2.5 |
| SEROX TK1200 | 1200 | 5 | — | 1 |

It can be seen that full activation starts at 600° C. with a BET surface of 36 m$^2$/g and continues until 900° C. Thereafter, deactivation sets in, which is recognizable by the low BET surface. In each case, the annealing losses as determined amounted to less than 2% by weight. There were transition modifications from aluminum hydroxide (Al$_2$O$_3$×3H$_2$O) to $\alpha$-aluminum oxide in the form of transition alumina (so-called gamma-Al$_2$O$_3$) whose percentage decreased with an increasing temperature. Even at 1200° C., the transition into the alpha form was not yet complete.

EXAMPLE 4

An alumina-containing residual substance according to Example 1 was calcinated by means of a gas-heated rotary kiln at product temperatures of 800, 1000, 1200, and 1400° C. with a holding time of 60 minutes. With an increasing temperature, an increasing amount of agglomerates occurred in sizes up to several centimeters. After calcination, the following characteristics were obtained:

| Product | Temperature [° C.] | BET Surface [m$^2$/g] | Al-metal [%] |
|---|---|---|---|
| SEROX K800 | 800 | 30 | 3 |
| SEROX K1000 | 1000 | 8 | 1.5 |
| SEROX K1200 | 1200 | 2 | 0.5 |
| SEROX K1400 | 1400 | 0.2 | <0.5 |

The annealing losses as determined in each case were smaller than 2% by weight. Up to 1200° C. there were still transition modifications from aluminum hydroxide (Al$_2$O$_3$×3H$_2$O) to $\alpha$-aluminum oxide in the form of transition alumina (so-called gamma-Al$_2$O$_3$) whose percentage decreased with an increasing temperature. At 1400° C., the transition into the alpha form and the oxidation of the Al metal were practically complete.

EXAMPLE 5

SEROX T (according to Example 2), SEROX TK750 (according to Example 3), lime, cement, water glass, and water were weighed at room temperature, placed into a plastic mug, and mixed by briefly being stirred (for approx. 1 minute) to form a paste, using a spoon. After a few minutes, gas developed in the paste, which led to the formation of foam and an increase in volume, combined with a considerable increase in temperature and rapid hardening of the mass. The recorded results refer to the increase in volume (measurements taken of the height of the foamed-up mass), the reaction temperature (measured by a thermometer introduced into the mass), the reaction time, and the bulk density of the mass (measured on the basis of the weight and volume of the mass). As can be seen in the Table below, by thermally activating the high-alumina powder, it is possible to use the metallic aluminum contained therein as a gas-forming porosifying substance for inorganic binding agent building materials. The increases in volume achieved amount to values up to 500%. In most cases, the substance solidified into a mechanically stable member after reaction times of no more than 5–10 minutes.

It can be derived from the above that the increases in volume and the reaction times can be controlled by combining different activation conditions of the high-alumina powder. The activated high-alumina powder is advantageous in that, at the same time, it acts as an inorganic stone-forming component, a lean substance, volume forming agent while, at the same time, avoiding the handling of explosive aluminum powder.

It can also be seen that several hours of solidification (Example 1) can be accelerated to just a few minutes (Example 5).

| Quantity weighed [g] | 1 | 2 | 3 | 4 | 5 | 6 | 7 | 8 |
|---|---|---|---|---|---|---|---|---|
| SEROX T | 450 | — | — | 250 | — | — | — | — |
| SEROX TK750 | — | 450 | 450 | — | 250 | 450 | 375 | 250 |
| White fine lime | 35 | 35 | 70 | — | — | — | — | — |
| Portland Cement CEM II | — | — | — | 250 | 250 | — | 125 | — |
| Alumina Cement Fondu | — | — | — | — | — | — | — | 250 |
| Water glass | — | — | — | 200 | 200 | 400 | 200 | 200 |
| 50% Sodium Hydroxide Solution | — | — | — | 100 | 100 | — | 100 | 100 |
| Water | 225 | 250 | 330 | — | — | — | 50 | — |
| 50. | | | | | | | | |
| Increase in volume [%] | — | 70 | 150 | 140 | 350 | 350 | 490 | 250 |
| Reaction temperature [° C.] | 24 | 43 | 69 | 24 | 40 | 76 | 68 | 48 |
| Reaction time [min] | 5 | 3 | 3 | 20 | 10 | 10 | 8 | 6 |
| Bulk density [g/cm³] | 1.93 | 1.35 | 0.74 | 1.51 | 0.60 | 0.63 | 0.43 | 0.60 |

What is claimed is:

1. A porosifying, solidification-accelerating additive for binding agent building materials, consisting of $Al_2O_3$, 50–90%; MgO, 4–20%; $SiO_2$, 0.5–15%; AlN, 0.1–5%; $Fe_2O_3$, 0.1–5%; CaO, 0.1–5%; F, 0.1–5%; $Na_2O$, 0.1–5%; $K_2O$, 0.1–2%; as well as in the form of metallic particles: Al, 0.1–10%; Si, 0.1–3%; Fe, 0.1–3%; balance in total maximum, 5%; annealing losses, 0.1–15%; and of mineral main constituents in the form of corumdum ($\alpha$-$Al_2O_3$) and spinel (MgO×$Al_2O_3$);

wherein the metallic aluminum particles are enveloped by mineral transition modifications from aluminum hydroxide ($Al_2O_3 \times 3H_2O$) to $\alpha$-aluminum oxide; and wherein the powder comprises a particle size of at least 90% smaller than 500 µm and wherein the BET surface of the powder amounts to at least 10 m² µ/g.

2. The porosifying, solidification-accelerating additive for binding agent building materials as recited in claim 1, wherein the sheathing from the mineral transition modifications comprises a permeability for gases and aqueous fluids.

3. The porosifying, solidification-accelerating additive for binding agent building materials as recited in claim 1, wherein the sheathing from the mineral transition modifications comprises a pore distribution within the range of 2 to 200 nanometers.

4. The porosifying, solidification-accelerating additive for binding agent building materials recited in claim 1, comprising a specific BET surface of 10–50 m²/g.

5. The porosifying, solidification-accelerating additive for binding agent building materials as recited in claim 1, comprising a particle size of at least 90% smaller than 200 µm.

6. A process of producing a porosifying, solidification-accelerating additive for binding agent building materials comprising the steps of providing a high-alumina material consisting of $Al_2O_3$, 50–90%; MgO, 4–20%; $SiO_2$, 0.5–15%; AlN, 0.1–5%; $Fe_2O_3$, 0.1–5%; CaO, 0.1–5%; F, 0.1–5%; $Na_2O$, 0.1–5%; $K_2O$, 0.1–2%; as well as in the form of metallic particles: Al, 0.1–10%; Si, 0.1–3%; Fe, 0.1–3%; balance in total maximum, 5%; annealing losses, 0.1–15%; moisture, 20–40%; and of mineral main constituents in the form of corumdum ($\alpha$-$Al_2O_3$) and spinel (MgO× $Al_2O_3$), as well as aluminum hydroxide crushed mechanically to a particle size of at least 90% smaller than 500 µm;

carrying out a thermal treatment of the powder in a flue gas flow down to a residual moisture of 2% maximum by shock drying at flue gas temperatures of 400–500° C. in a drying time of less than 10 seconds; and effecting thermal activation by partially calcinating the powder within a temperature range of 400–1000° C., wherein the holding time is calculated in such a way that there is obtained a BET surface of the activated powder of at least 10 m²/g, and wherein the metallic aluminum particles are enveloped by mineral transition modifications from aluminum hydroxide ($Al_2O_3 \times 3H_2$) to $\alpha$-aluminum oxide.

7. The process recited in claim 6, wherein the porosifying powder is activated by being partially calcinated at a minimum temperature of 600° C. and a maximum temperature of 900° C.

* * * * *